United States Patent
Chevrette

[19]

[11] Patent Number: 5,980,204
[45] Date of Patent: Nov. 9, 1999

[54] METHOD OF ESTABLISHING HOOK DIAMETERS ON DIAPHRAGM PACKING RING DOVETAILS

[75] Inventor: Richard Jon Chevrette, Cohoes, N.Y.

[73] Assignee: General Electric Co., Schenectady, N.Y.

[21] Appl. No.: 09/067,219

[22] Filed: Apr. 28, 1998

[51] Int. Cl.[6] .............................. F01D 11/02; B23P 6/00
[52] U.S. Cl. .................... 415/174.5; 415/170.1; 415/173.1; 415/173.5; 415/173.7; 415/230; 29/402.02; 29/402.03; 29/402.08; 29/402.09; 29/402.11; 29/402.13; 29/402.16; 29/889.1; 29/889.21
[58] Field of Search .............................. 415/170.1, 173.1, 415/173.5, 173.7, 174.5, 230; 29/402.02, 402.03, 402.08, 402.09, 402.11, 402.13, 402.16, 889.1, 889.21

[56] References Cited

U.S. PATENT DOCUMENTS

| | | |
|---|---|---|
| 4,924,581 | 5/1990 | Jakobsen ............................ 29/402.02 |
| 5,149,248 | 9/1992 | Cramer ............................... 415/169.2 |
| 5,374,068 | 12/1994 | Jewett et al. . |
| 5,487,549 | 1/1996 | Dalton et al. ........................... 277/54 |
| 5,503,405 | 4/1996 | Jewett et al. . |
| 5,524,340 | 6/1996 | Galbraith et al. ..................... 29/889.1 |
| 5,599,026 | 2/1997 | Sanders et al. ......................... 277/53 |
| 5,601,403 | 2/1997 | Galbraith et al. . |

*Primary Examiner*—Christopher Verdier
*Assistant Examiner*—Matthew T. Shanley
*Attorney, Agent, or Firm*—Nixon & Vanderhye

[57] ABSTRACT

A turbine diaphragm for accommodating a rotor, comprising a diaphragm body having a radially inner bore and an inwardly recessed dovetail groove; a plurality of packing ring segments, each having a dovetail located within the dovetail groove; wherein the dovetail groove includes a hook portion which defines a radial opening into the groove and wherein the hook portion includes surfaces establishing a hook diameter having a center defined by the center of the rotor; and wherein the hook portions are radially outwardly extended by discrete elements installed axially in opposite directions through the diaphragm and projecting into the dovetail groove.

13 Claims, 4 Drawing Sheets

METHOD OF ESTABLISHING HOOK DIAMETERS ON DIAPHRAGM PACKING RING DOVETAILS

TECHNICAL FIELD

This invention relates to steam turbines generally, and more specifically, to a method of reestablishing hook diameters on diaphragm packing ring dovetails which, over time, have lost their original design shape and/or tolerances.

BACKGROUND AND SUMMARY

In many rotating machines, seals are provided between the rotating and stationary components. For example, in steam turbines, it is customary to employ seals which have a plurality of arcuate seal ring segments forming, for example, a 360° labyrinth seal, about and between a stationary component (such as a diaphragm) and the turbine rotor. Typically, the arcuate seal ring segments are disposed in an annular groove in the stationary component which is designed to be concentric about the axis of rotation of the machine, and hence concentric to the sealing surface of the rotor. Each arcuate seal segment carries an arcuate seal face in opposition to the sealing surface of the rotor. In labyrinth-type seals, the seal faces carry a radially-directed array of axially spaced teeth, which teeth are radially spaced from an array of axially extending annular grooves forming the sealing surface of the rotor. Alternatively, the rotor may have a smooth surface in radial opposition to the array of teeth on the seal faces. In any event, the sealing function is achieved by creating turbulent flow of the working media, i.e., steam, as it passes through the relatively tight clearances within the tortuous path defined by the seal.

In a typical installation, the annular groove in the diaphragm or other stationary component supporting the seal segments is dovetail-shaped, having opposed, axially oriented locating flanges or hooks defining a slot therebetween. In the exemplary embodiment described herein, the turbine diaphragm is split lengthwise so that the arcuate seal ring segments can be inserted into the respective semi-annular dovetail grooves. More particularly, the arcuate segments have similarly dovetail-shaped mounting portions with a pair of flanges directly axially away from one another for disposition within the dovetail groove, with a radially directed neck joining the seal face and the flanges of the segment, the neck located in the slot defined by the locating flanges of the dovetail groove. The neck thus carries the arcuate seal face radially inwardly of the groove when installed, and the locating flanges of the dovetail groove thus determine the radial position of the seal face vis-a-vis the rotor. The so-called "hook diameter" is measured from the rotor center radially outwardly to the radially outer surfaces of the hooks or locating flanges.

In the case of a steam turbine, it has been found that under normal working conditions, the turbine diaphragms (including those in the high pressure, intermediate pressure, and low pressure sections of the turbine) tend to lose their original round shape and/or specified tolerances. This is especially true in the above mentioned packing ring dovetail groove which, when out of tolerance, can cause unwanted steam leakage, or unwanted rubbing of components, both of which can cause a loss of turbine efficiency.

Welding is typically employed to correct the out of round/out of tolerance problem. The process requires either a weld repair along a locating flange or hook, or in some instances, filling the dovetail in completely. Stress relieving via an appropriate heat treatment method is then required due to the high heat of the welding process. The final step is the remachining of the dovetail to original tolerances. This process is both time consuming and expensive.

SUMMARY OF THE INVENTION

The present invention provides a simpler method of repair for rotary machinery seals and especially for steam turbine diaphragm packing ring dovetails. In the exemplary embodiment, reamed holes are drilled through opposite sides of the dovetail hooks, extending parallel to the rotor axis, and opening into the radial slot between the hooks. A relatively small portion of the hole diameter lies radially outwardly of the hooks, i.e., projecting into the dovetail groove. Precision dowels made from standard round steel bar stock are then inserted and welded into place. These dowels also project radially outwardly of the dovetail hooks, i.e., into the dovetail groove, thereby enlarging the hook diameter. Prior to insertion, a radially outer part of the dowel is machined along an axial portion thereof to provide a flat, and the dowel is installed so that it is the flat which determines the new hook diameter and which provides the seating surface for the radially inward facing surfaces of the seal dovetail. Only a small amount of weld material is required to fix the dowel in place, so that little or no distortion is created in the dovetail hooks, thereby eliminating the need for subsequent stress relief. Prior to installing the seal segments, some additional machining of the flats on the dowels reestablish precisely the original (or modified) hook diameter.

By eliminating excessive machining operations and stress relief requirements, the repair outages for steam turbines (which are required to be aggressively shorter due to the high cost carried by the utility customer for turbine "down time") are substantially lessened. More specifically, the present invention results in customer time savings as well as more easily managed and less costly outage schedules.

The invention here is applicable not only to conventional labyrinth seals, but also to the more recently developed combination brush seals/labyrinth seals, and other seal arrangements where dovetail or similarly configured slots are employed to mount the seal components.

Accordingly, in its broader aspects, the present invention relates to turbine diaphragm for accommodating a rotor, comprising a diaphragm body having a radially inner bore and an inwardly recessed dovetail groove; a plurality of packing ring segments located within the dovetail groove; wherein the dovetail groove includes a hook portion which defines a radial opening into the groove and wherein the hook portion includes surfaces establishing a hook diameter having a center defined by the center of the rotor; and wherein the hook portions are radially outwardly extended by discrete elements installed axially in opposite directions through the diaphragm.

In another aspect, the invention relates to a method of redefining a hook diameter of a turbine diaphragm dovetail groove which includes a pair of axially spaced hooks defining a slot therebetween forming part of the dovetail groove, and wherein the hook diameter extends from the rotor to the radially outer surface of the hooks; the method comprising the steps of:

a) removing existing packing ring seal segments from the dovetail groove;

b) drilling holes at least partially through the axially spaced hooks, the holes extending axially with at least portions thereof lying radially outwardly of the hooks;

c) inserting a dowel in each of the holes such that at least a part of the dowel lies radially outwardly of a respective one of the hooks; and d) machining the part of each dowel to establish a new hook diameter.

Other objects and advantages of the subject invention will become apparent from the detailed description which follows.

DETAILED DESCRIPTION OF THE DRAWINGS

Reference will now be made in detail to a present preferred embodiment of the invention, an example of which is illustrated in the accompanying drawings.

Figure 1:
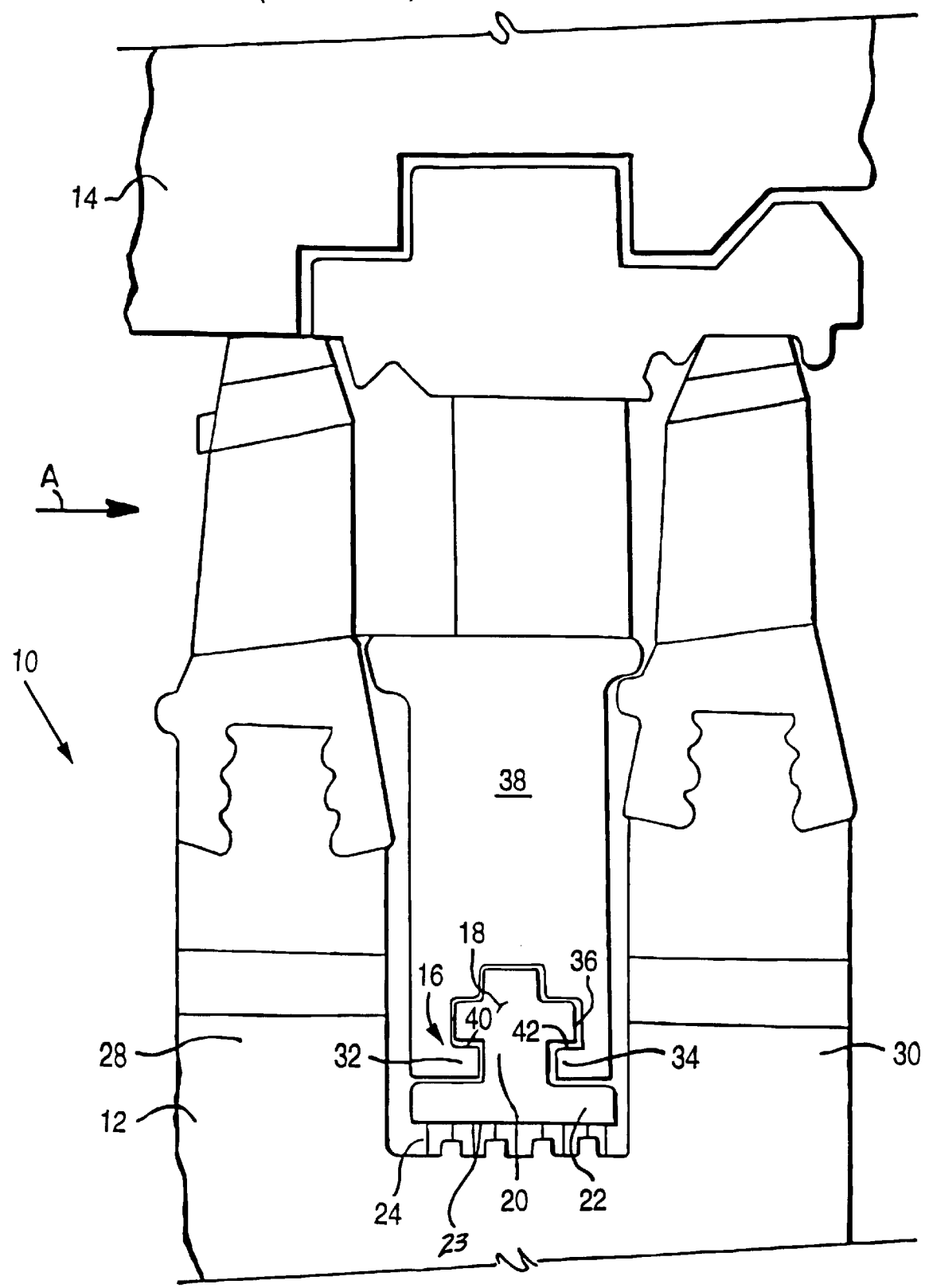
FIG. 1 is a partial side elevation of a steam turbine diaphragm and associated packing ring segment.

Referring now to FIG. 1, there is illustrated a portion of a steam turbine, generally designated 10, having a turbine shaft 12 mounted for rotation within a turbine housing 14. A packing ring seal in the form of a labyrinth seal 16 includes a plurality of arcuate seal ring segments (one shown at 18) disposed about the turbine shaft 12, each segment having a dovetail mounting portion 20 and a sealing portion 22. The latter has a sealing face 23 and radially inwardly directed teeth 24 which cooperate with annular ridges and grooves 26, 27, respectively, in the rotor to provide a tortuous path for the stream. In general, the labyrinth seal 16 functions by placing a relatively large number of partial barriers to the flow of steam (flowing in the direction of arrow A) from the high pressure region to the low pressure region. Each barrier forces steam, attempting to flow parallel to the axis of turbine shaft 12, to follow a tortuous path whereby a pressure drop is created. The sum of all the pressure drops in the labyrinth seal 16 is, by definition, the pressure difference between the high and low pressure regions 28 and 30.

As explained previously, one of the major problems associated with the initial placement of the annular sealing rings and their maintenance, including refurbishing and replacement, is the necessity to maintain the seal ring segments 18 concentric about the sealing surface of the rotor 12 and with seal faces at a uniform radial clearance, notwithstanding any distortion, eccentricity or non-standard size of the locating or hook flanges 32, 34 of the dovetail groove 36 located within the turbine diaphragm 38. That is, the radially outer surfaces 40, 42 of the locating flanges or hooks of the seal ring support structure, oftentimes with use and wear, obtain an ellipticity or an eccentricity with respect to the rotor axis whereby fitting the seal ring segments 18 to the locating flange surfaces 40, 42 results in non-uniform radial clearance between the seal face 23 and the sealing surface of the rotor 12.

The present invention therefore reestablishes a uniform radial clearance between the seal faces 23 of the segments 18 and the sealing face of the rotor 12, notwithstanding any out-of-roundness or eccentricity of the locating flanges 32, 34 of the turbine housing due to use and wear or a non-standard size of the locating flanges. The invention is applicable to both conventional and positive pressure variable clearance type labyrinth seal rings. The invention is also useful to reestablish clearance and tolerances for the installation of brush seals mentioned previously.

Figure 2:
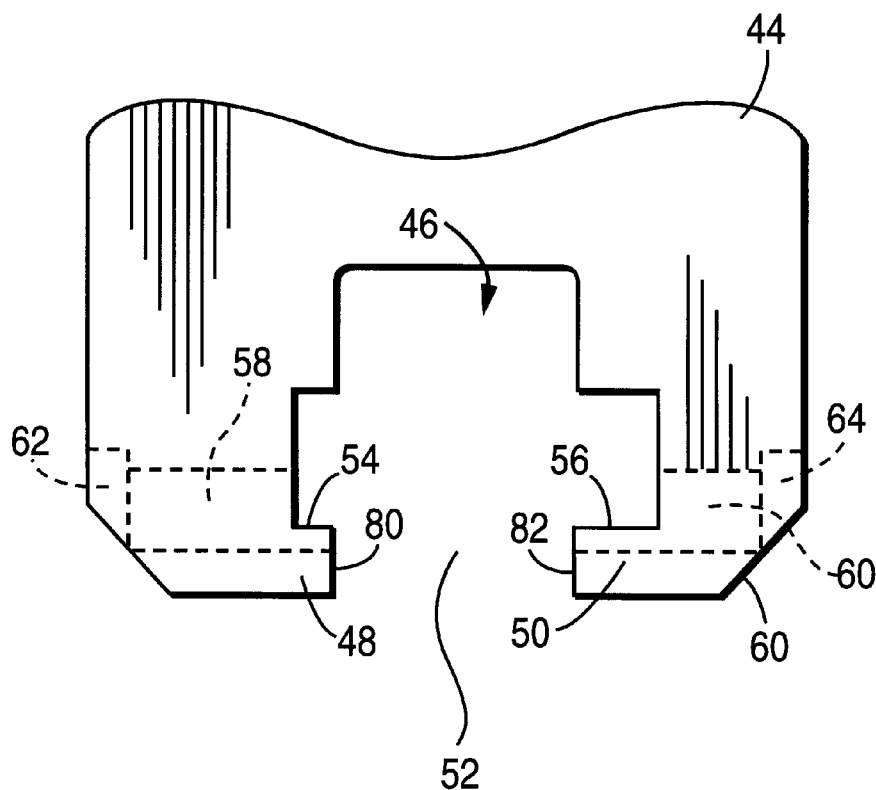
FIG. 2 is a partial side elevation of a dovetail groove in a steam turbine diaphragm with axially opposed holes drilled through the diaphragm in accordance with an exemplary embodiment of the invention.

With reference now to FIG. 2, a stationary turbine component 44 which may be similar to the diaphragm 38 shown in FIG. 1, and which may be located in the HP, IP or LP section of a steam turbine, includes a dovetail groove, generally indicated at 46. The latter includes a pair of axially spaced locating flanges or hooks 48, 50 which face each other, defining a radial opening or slot 52 therebetween. The "hook diameter" of the dovetail is thus measured as the distance from the axis of the turbine rotor to the radially outer surfaces 54, 56 of the hooks 48, 50, and it will be appreciated that this diameter is critical to the precise radial location of the seals.

For diaphragms which have during use lost their original tolerances, or which have become distorted or out of round, repair is usually done in the field, and typically involves removal of the diaphragm and all seal segments, and subsequent installation of new seal segments. The diaphragm itself is typically repaired by welding as described briefly above.

FIG. 2 illustrates a first step in the repair of the diaphragm 44 per se in accordance with an exemplary embodiment of this invention. Initially, following removal of the diaphragm and seal segments, axial holes 58, 60 are drilled through the diaphragm from opposite sides of the dovetail groove 46. Specifically, and with reference to the left hand side of FIG. 2, the hole 58 is located at a radial position where a major chordal portion of the hole lies radially outward of the hook surface 54. This arrangement insures that a part of any pin or dowel of roughly equal diameter to that of the hole protrudes above the hook in a radial direction, thereby establishing a new, larger hook diameter, as explained further below. A similar hole is drilled on the opposite side of the dovetail, for receiving a similar dowel. If necessary, the holes 58, 60 may be counterbored as shown at 62, 64, respectively.

Referring now to FIGS. 3, 4, 6 and 7, the dowels or pins 66, 68 which are to be inserted into the holes 56, 58 are made from standard round steel stock. Note that one end of the pin 66 is machined to create a flat 70, best seen in FIGS. 6 and 7, extending to a radial shoulder 71. In addition, one edge of the flat surface is chamfered transversely of the flat, as shown at 72 for a purpose explained below. While the axial length of the hook 56 differs from hook 54, the pins can be of substantially identical length.

Figure 3:
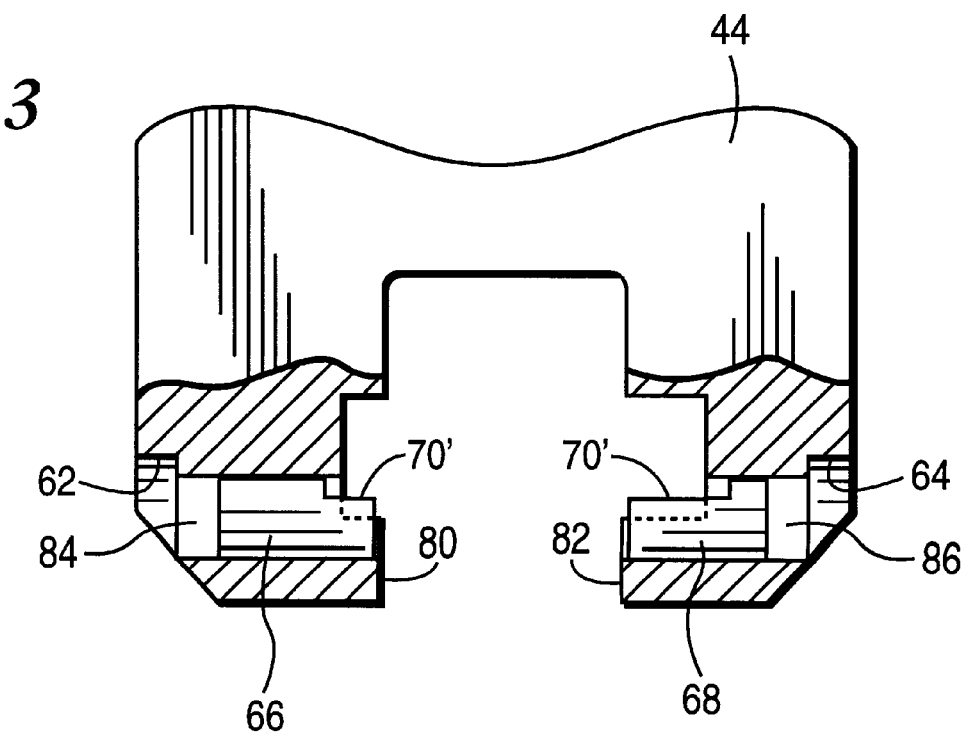
FIG. 3 is a partial side elevation similar to FIG. 2 but with dowels located within the drilled holes in the diaphragm wall.
Figure 4:
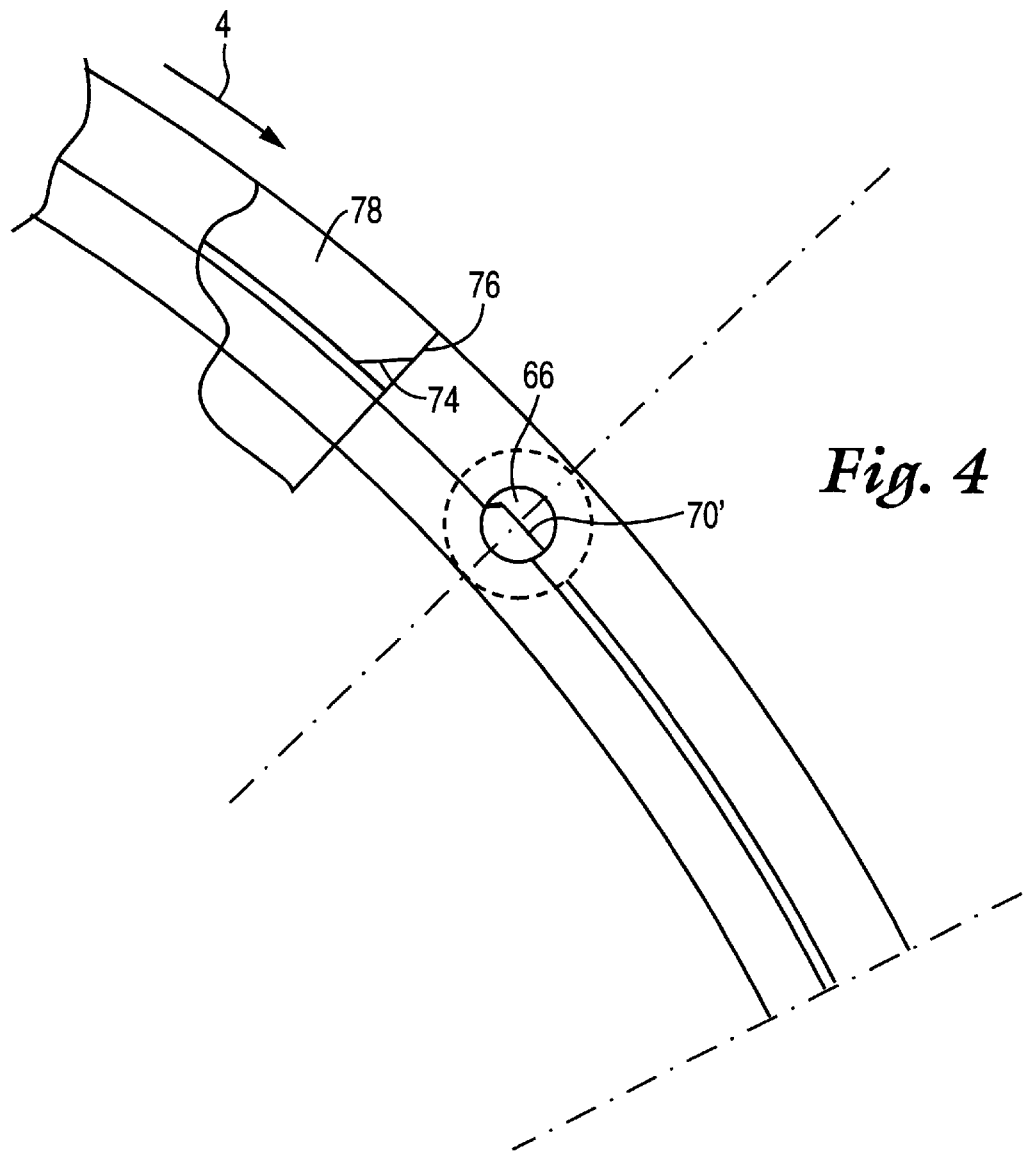
FIG. 4 is a partial end view of the turbine diaphragm as illustrated in FIGS. 2 and 3.

The dowels or pins 66, 68 are inserted until their inner edges (i.e., the edges facing the dovetail groove) lie just short (axially) of the opposed surfaces 80, 82 of the hooks 48, 50 which define the slot 52. In the preferred embodiment, the length of the pins 66, 68 is such that the rearward end of the pins lie recessed within the holes 54, 56 as best seen in FIG. 3. The remaining recess itself may be filled with weld material 84, 86, thus creating a plug weld to hold the dowels in place. The amount of weld material is sufficiently small, however, that no distortion of the hook dovetail occurs, and thus no stress relief step is required.

After installation, the flats 70 are machined to a new surface 70' which reestablishes precisely the original or modified hook diameter. Note the change in cross-section as best seen by comparing the dowel in FIG. 7 as installed and the dowel in FIG. 4 after machining.

Upon completion of the machining, both sides of the dovetail throat or neck area (on opposite sides of slot 52) are cleaned up to make the pins or dowels flush for packing ring clearance if necessary.

The chamfered edge 72 of the dowel is arranged to face the packing ring segments in the direction of packing ring assembly. A complementary chamfer 74 is formed on an edge 76 of the packing ring segment 78 (partially shown in FIG. 4). This arrangement facilitates the circumferential sliding of the segments into place within the dovetail in the direction of arrow A in FIG. 4. It is especially important to incorporate the chamfers when springs are in place within the dovetail which urge the packing ring segments in a radially inward direction, i.e., towards the rotor even during assembly.

Figure 5:
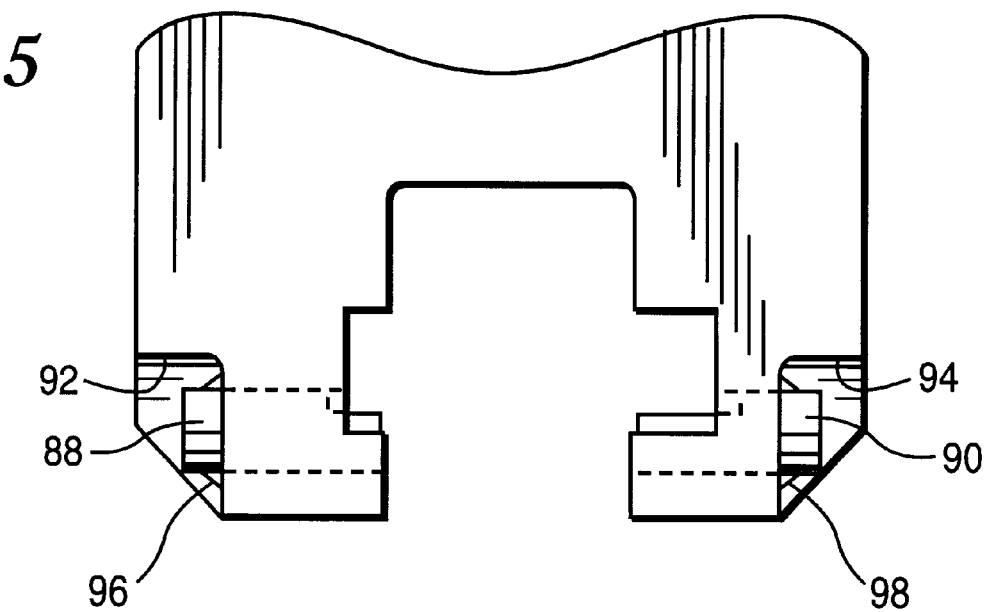
FIG. 5 is a partial side elevation of a turbine diaphragm with dowels in place but in accordance with a second exemplary embodiment of the invention.
Figure 6:
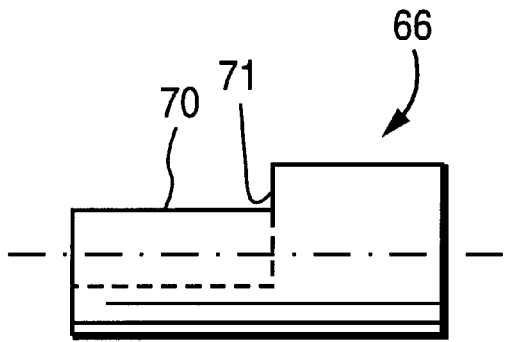
FIG. 6 is a side elevation of a dowel for use with turbine diaphragms in accordance with the invention.
Figure 7:
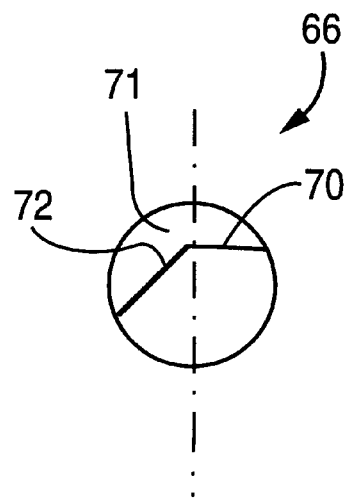
FIG. 7 is an end view of the dowel illustrated in FIG. 6.

In an alternative arrangement as shown in FIG. 5, the pins or dowels 88, 90 are lengthened so as to protrude into the counterbored portions 92, 94. This allows the pins or dowels to be fillet welded about the back ends of the pins as shown at 96, 98.

In a typical scenario, loading calculations for the packing ring segments will determine the number of pins or dowels required for each seal segment. For example, four to six pins may be provided per segment (typically three packing ring segments are installed in each 180° diaphragm segment. This includes 2 or 3 pins or dowels per side of each segment.

Figure 8:
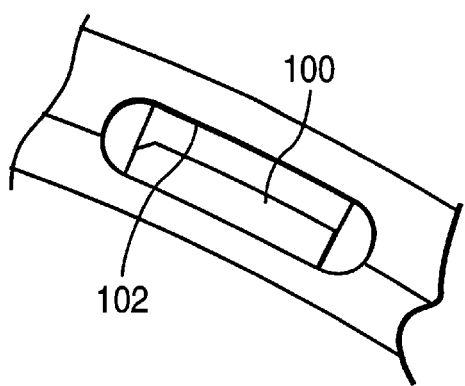
FIG. 8 is a partial end view of a turbine diaphragm with an elongated pad as an alternative to the round pin shown in FIGS. 6 and 7.

For even greater loading requirements, additional bearing surface may be required, and this can be accomplished by utilizing bearing pads 100 rather than pins or dowels. One such pad is shown in FIG. 8. The installation is similar to that described above, but the access hole 102 is re-shaped to permit insertion of the pad.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine diaphragm for accommodating a rotor, comprising:

a diaphragm body having a radially inner bore and an inwardly recessed dovetail groove;

a plurality of packing ring segments, each having a dovetail located within said dovetail groove;

wherein said dovetail groove includes a hook portion which defines a radial opening into said dovetail groove and wherein said hook portion includes at least one annular surface establishing a hook diameter having a center defined by the center of the rotor; and wherein said hook portion is radially outwardly extended by a plurality of discrete elements installed axially through said diaphragm at circumferentially spaced positions about said annular surface and projecting into the dovetail groove from said hook portion to thereby define a new hook diameter.

2. The diaphragm of claim 1 wherein said hook portion includes a pair of opposed hook flanges, and wherein said plurality of discrete elements include dowels projecting into the dovetail groove from the opposed hook flanges.

3. The diaphragm of claim 1 wherein said plurality of discrete elements comprise dowels.

4. The diaphragm of claim 3 wherein each dowel has a flat surface thereon which provides an engagement surface for the dovetail.

5. The diaphragm of claim 3 wherein each dowel includes a chamfered surface adapted to engage a packing ring when inserted into the dovetail groove in an assembly direction.

6. A method of redefining a hook diameter of a turbine diaphragm dovetail groove which includes a pair of axially spaced hook flanges defining a slot therebetween forming part of the dovetail groove, and wherein the hook diameter extends from a centerline of the rotor centerline to the radially outer surface of said hook flanges; the method comprising the steps of:

a) removing existing packing ring seal segments from the dovetail groove;

b) drilling holes at least partially through said axially spaced hook flanges, said holes extending axially with at least portions thereof lying radially outwardly of said hook flanges;

c) inserting a dowel in each of said holes such that at least a part of said dowel lies radially outwardly of a respective one of said hook flanges; and d) machining said part of each said dowel to establish a new hook diameter.

7. The method of claim 6 wherein step b) is carried out by drilling at least two holes and inserting at least two dowels on each side of said diaphragm for each packing seal ring segment.

8. The method of claim 6 wherein step b) is carried out by drilling at least three holes and inserting at least three dowels on each side of said diaphragm for each packing seal ring segment.

9. The method of claim 6 wherein said dowels are welded in said holes in a manner that does not require heat treatment of the diaphragm after welding.

10. The method of claim 7 wherein each dowel has an axially extending flat surface thereon which provides an engagement surface for a dovetail mounting portion of a respective packing ring seal segment.

11. The method of claim 9 wherein each dowel includes a chamfered surface adapted to engage a dovetail mounting portion of a packing ring seal segment when inserted into the dovetail groove in an assembly direction.

12. The method of claim 6 wherein said packing ring seal segments comprise labyrinth seals.

13. The method of claim 6 wherein said packing ring seal segments comprise brush seals.

\* \* \* \* \*